United States Patent
Sisbot et al.

(10) Patent No.: US 12,525,032 B2
(45) Date of Patent: Jan. 13, 2026

(54) SYSTEMS AND METHODS OF VISUAL SONAR FOR ADAPTED VEHICLE GEOMETRY

(71) Applicant: Toyota Motor Engineering & Manufacturing North America, Inc., Plano, TX (US)

(72) Inventors: Emrah Akin Sisbot, Mountain View, CA (US); Xiaofei Cao, Mountain View, CA (US); Hangquan Zhao, Mountain View, CA (US)

(73) Assignees: Toyota Motor Engineering & Manufacturing North America, Inc., Plano, TX (US); Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 18/742,310

(22) Filed: Jun. 13, 2024

(65) Prior Publication Data

US 2025/0050946 A1 Feb. 13, 2025

Related U.S. Application Data (60) Provisional application No. 63/531,062, filed on Aug. 7, 2023.

(51) Int. Cl.
*G06V 20/58* (2022.01)
*B60Q 9/00* (2006.01)
(Continued)

(52) U.S. Cl.
CPC .......... *G06V 20/586* (2022.01); *B60Q 9/008* (2013.01); *B60R 1/27* (2022.01); *B60W 30/09* (2013.01);
(Continued)

(58) Field of Classification Search
CPC .... B62D 15/02; B62D 15/027; B62D 15/028; B62D 15/0275; B62D 15/0285;
(Continued)

(56) References Cited

U.S. PATENT DOCUMENTS

| 2013/0257852 A1* | 10/2013 | Meeker | ................. G01C 23/00 345/419 |
| 2019/0347498 A1* | 11/2019 | Herman | ................. G08G 1/162 |

(Continued)

FOREIGN PATENT DOCUMENTS

| CN | 106114494 B | 7/2019 |
| CN | 110979234 A | 4/2020 |

(Continued)

OTHER PUBLICATIONS

2003 IEEE/RSJ, Intl. Conference on Intelligent Robots and Systems; Scott Lenser et al., "Visual sonar: Fast Obstacle Avoidance Using Monocular Vision", pp. 886-891, Oct. 2003, Las Vegas, Nevada (https://www.researchgate.net/ublication/2945677_Visual_Sonar_Fast_Obstacle_Avoidance_Using_Monocular_Vision).

*Primary Examiner* — Peet Dhillon
(74) *Attorney, Agent, or Firm* — Dinsmore & Shohl LLP (57) ABSTRACT

Embodiments of systems and methods for adapted vehicle geometry include a vehicle and one or more processors. The vehicle includes a camera operable to generate an image of an environment surrounding the vehicle. The environment includes a parking space and an object removably attached to the vehicle. The one or more processors operable to identify the object as attached to the vehicle, generate, using a pre-trained depth algorithm, a depth map based on the image, generate a boundary of the parking space and a boundary of the vehicle combined with the object based on the depth map, determine whether a distance between the boundary of the parking space and the boundary of the vehicle combined with the object is less than a threshold (Continued)

value, and output an alert in response to determining that the distance is less than the threshold value.

18 Claims, 7 Drawing Sheets

(51) Int. Cl.
| | | |
|---|---|---|
| B60R 1/27 | (2022.01) | |
| B60W 30/09 | (2012.01) | |
| B62D 15/02 | (2006.01) | |
| G06T 7/20 | (2017.01) | |
| G06T 7/50 | (2017.01) | |
| G08G 1/16 | (2006.01) | |

(52) U.S. Cl.
CPC ............ *B62D 15/0275* (2013.01); *G06T 7/20* (2013.01); *G06T 7/50* (2017.01); *G08G 1/168* (2013.01); *B60R 2300/102* (2013.01); *B60R 2300/307* (2013.01); *B60R 2300/806* (2013.01); *B60W 2420/403* (2013.01); *B60W 2554/80* (2020.02); *G06T 2207/10016* (2013.01); *G06T 2207/10024* (2013.01); *G06T 2207/10028* (2013.01); *G06T 2207/30264* (2013.01)

(58) Field of Classification Search
CPC ........ B62D 13/06; G06V 10/10; G06V 20/58; G06V 20/586
See application file for complete search history.

(56) References Cited

U.S. PATENT DOCUMENTS

| | | | |
|---|---|---|---|
| 2022/0219678 A1* | 7/2022 | Suzuki | B60W 60/001 |
| 2024/0249531 A1* | 7/2024 | Park | G06V 10/82 |
| 2024/0354921 A1* | 10/2024 | Garg | G06V 20/56 |
| 2024/0394860 A1* | 11/2024 | Park | G01C 15/002 |

FOREIGN PATENT DOCUMENTS

| | | | | |
|---|---|---|---|---|
| CN | 111402132 A | 7/2020 | | |
| CN | 111932481 A | 11/2020 | | |
| CN | 114495066 A | 5/2022 | | |
| DE | 102010039092 B4 | 10/2020 | | |
| EP | 3284649 A1 * | 2/2018 | ............. | B60D 1/245 |

* cited by examiner

SYSTEMS AND METHODS OF VISUAL SONAR FOR ADAPTED VEHICLE GEOMETRY

CROSS-REFERENCE TO RELATED APPLICATION

This application claims priority to U.S. Provisional Application No. 63/531,062 filed Aug. 7, 2023, the disclosure of which is incorporated herein by reference in its entirety.

TECHNICAL FIELD

The present specification generally relates to vehicle assistance systems and, more specifically, to vehicle assistance systems with visual sonar for adapted vehicle geometry.

BACKGROUND

Vehicle assistance systems and autonomous vehicle systems often relies on the dimension of the vehicle in providing assistance and operating the vehicle. However, vehicle dimension often changes with external attachments to the vehicle, which may cause potential collisions with obstacles such as walls, poles, or other vehicles. This limitation not only heightens the likelihood of property damage but also raises concerns for pedestrian safety in crowded urban environments. Accordingly, there exists a need for vehicle assistance systems that dynamically modify the vehicle's dimensions to provide assistance to the drivers based on adapted vehicle geometry and mitigate collision risks during parking processes.

SUMMARY

In one embodiment, a system for adapted vehicle geometry includes a vehicle and one or more processors. The vehicle includes a camera operable to generate an image of an environment surrounding the vehicle. The environment includes a parking space and an object removably attached to the vehicle. The one or more processors operable to identify the object as attached to the vehicle, generate, using a pre-trained depth algorithm, a depth map based on the image, generate a boundary of the parking space and a boundary of the vehicle combined with the object based on the depth map, determine whether a distance between the boundary of the parking space and the boundary of the vehicle combined with the object is less than a threshold value, and output an alert in response to determining that the distance is less than the threshold value.

In another embodiment, a method for adapted vehicle geometry includes identifying an object as attached to a vehicle based on an image of an environment captured by a camera attached to the vehicle, the environment comprising a parking space and the object, generating, using a pre-trained depth algorithm, a depth map based on the image, generating a boundary of the parking space and a boundary of the vehicle combined with the object based on the depth map, determining whether a distance between the boundary of the parking space and the boundary of the vehicle combined with the object is less than a threshold value, and outputting an alert in response to determining that the distance is less than the threshold value.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments of systems and methods disclosed herein include a vehicle, one or more cameras, and one or more processors. The cameras are operably imaging an environment around the vehicle and one or more attached objects attached to the vehicle. The processor is operable to generate a depth map of the environment and the attached objects based on an image generated by the camera, determine a distance between the vehicle and interested objects in the environment based on the depth map, adjust the vehicle dimension of the vehicle, and cause the vehicle to operate based on the adjusted vehicle dimension and the distance according to the interested objects. For example, the system may generate a warning regarding the distance between the vehicle and a parking space or an obstacle, where the distance is determined based on the adjusted vehicle dimension. The system may recognize the attached objects from the image or the depth map generated from the image, and further determine the size and position of the attached objects relative to the vehicle to further update the vehicle dimension. With the updated vehicle dimension, the system may recognize parking spaces, determine distances to them, and provide real-time feedback to the driver regarding the distance between the vehicle and available parking spaces, helping to guide parking maneuvers and avoid collisions with nearby objects.

As disclosed herein, monocular depth estimation (MDE) refers to a computer vision task regarding predicting the depth information of a scene (e.g., the environment surrounding a vehicle of interest) from one or more images, especially regarding estimating distances of objects in the scene in the one or more images from the viewpoint of the corresponding imaging devices, such as cameras. For example, an MDE algorithm described herein may be a process in computer vision and deep learning where depth information is estimated from one image captured by a single camera. In some embodiments, the MDE algorithm may conduct depth estimation based on multi-view geometry of rectified stereo- or multi-camera images. The MDE algorithms described herein may include machine-learning functions to predict depth from the images. The MDE algorithms may include depth and pose networks, where the depth network predicts depth maps of the scene, and the pose network estimates the camera's motion between successive frames. Accordingly, by reconstructing the 3D structure of the scene and the attached objects from images, the MDE-based techniques described herein can create adapted vehicle geometry and enhance the understanding of the vehicle's surrounding environment for obstacle avoidance, scene reconstruction, and object recognition.

Figure 1:
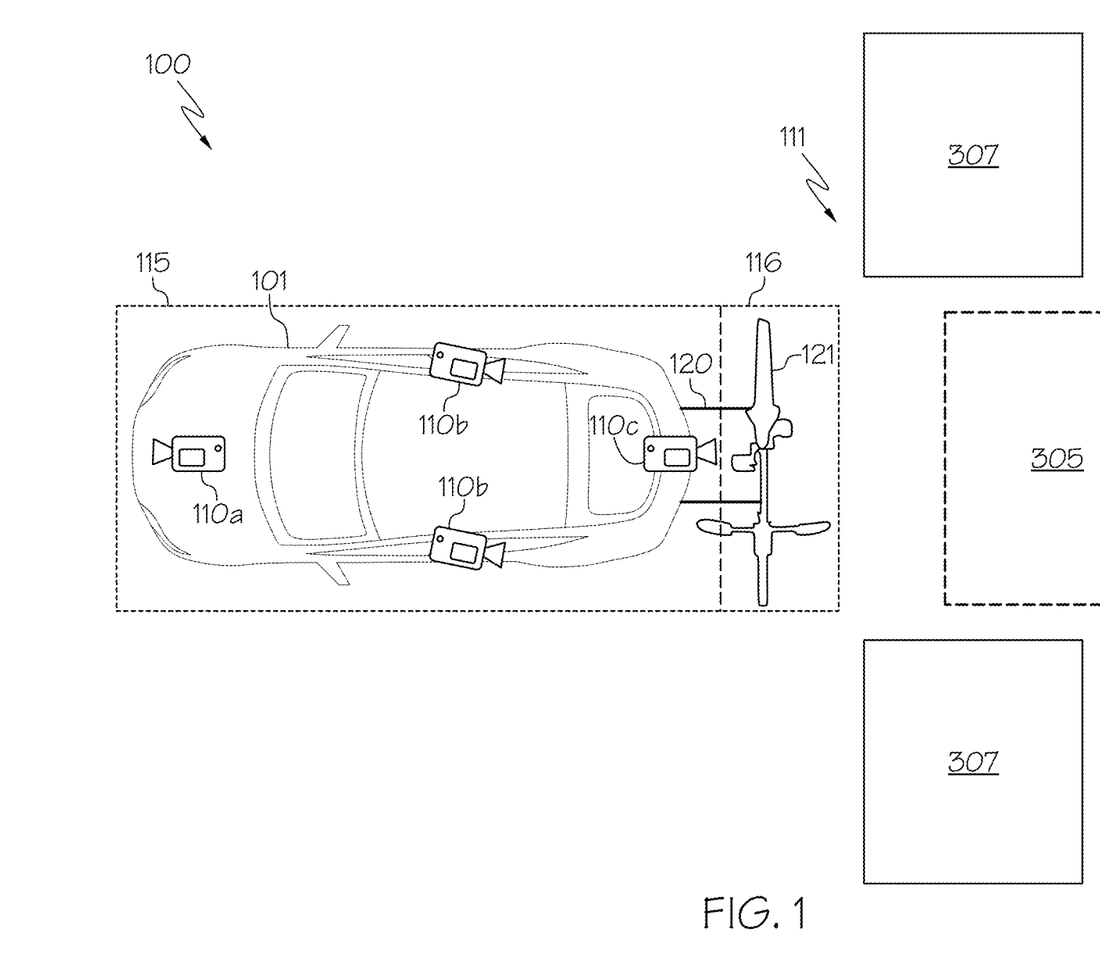
FIG. 1 schematically depicts a system using monocular depth estimation (MDE) to monitor an environment around the vehicle when the vehicle includes an object attached to the vehicle, according to one or more embodiments shown and described herein.

Referring now to figures, FIG. 1 depicts the visual sonar system 100 for adapted vehicle geometry. The visual sonar system 100 may include one or more cameras 110 (for example, a front camera 110a, one or more side cameras 110b, and a rear camera 110c) attached to a vehicle 101 and configured to image an environment 111 surrounding the vehicle 101 in real-time. The cameras 110 may be operably generating one or more images 301 (e.g., as illustrated in FIGS. 3A-3D) of the environment 111 around the vehicle 101. The environment 111 may include one or more obstacles 307 and one or more parking spaces 305. The visual sonar system 100 may perform depth analyze, such as MDE, to generate a depth map 401 (e.g., as illustrated in FIGS. 4A and 4B) of the environment 111 based on the images 301 (e.g., as illustrated in FIGS. 3A-3D) generated by the cameras 110 to evaluate the distances and relative positions between the vehicle 101, the parking spaces 305, and the obstacles 307 in the environment 111.

In embodiments, the environment 111 may include one or more attached objects 121 to the vehicle 101 that change the dimension of the vehicle 101. The images 301 captured by the cameras 110 may include the environment 111 that may further include the one or more attached objects 121 attached to the vehicle 101. The vehicle 101 may have an original vehicle boundary 115. The visual sonar system 100 may recognize the attached objects 121 and further determine an attachment boundary of the attached objects 121 based on the images 301 and/or the depth maps 401. The visual sonar system 100 may determine an updated vehicle dimension based on the attachment boundary 116. For example, the updated vehicle dimension with the attached object 121 may be the sum of the original vehicle boundary 115 and the attachment boundary 116. Accordingly, the visual sonar system 100 may detect the changes in geometry of the vehicle 101 when attached objects 121 like a bicycle and attachment accessories 120 such as a stand or a rack are attached to the vehicle 101 using MDE along with the cameras 110 such as the side cameras 110b and rear camera 110c of the vehicle 101. Once the changes are determined, the visual sonar system 100 may adapt thresholds of the vehicle boundary and further function to sense widths of spaces and the distances using images 301 and MDE processing to provide desired assistances and operations.

In embodiments, the vehicle 101 may be an automobile or any other passenger or non-passenger vehicle such as, for example, a terrestrial, aquatic, and/or airborne vehicle. The vehicle 101 may be an autonomous vehicle that navigates its environment 111 with limited human input or without human input. The vehicle 101 may include actuators for driving the vehicle, such as a motor, an engine, or any other powertrain. The vehicle 101 may move or appear on various surfaces, such as, without limitation, roads, highways, streets, expressway, bridges, tunnels, parking lots, garages, off-road trails, railroads, or any surfaces where the vehicles may operate. For example, the vehicles 101 may move within a parking lot or parking place, which includes one or more parking spaces 305. The vehicle 101 may move forward or backward.

As mentioned above, the vehicle 101 may include one or more cameras 110. The cameras 110 may be mounted to the exterior of the vehicle 101 at the front of the vehicle 101, at the rear of the vehicle 101, on the side of the vehicle 101, on top of the vehicle 101, and/or at any other location on the vehicle 101. For example, the cameras 110 can be mounted to the rear of the vehicle 101 and/or one or more side view mirrors of the vehicle 101 and can have a field of view of various objects in the environment 111, such as an attached object 121 mounted on the vehicle 101. The cameras 110 may be, without limitation, one or more of monocular cameras, red-green-blue (RGB) cameras, or red-green-blue-depth (RGB-D) cameras. The cameras 110 may be configured to capture one or more images 301 of the environment 111. The images 301 may be, without limitation, monocular images, RGB images, or RGB-D images. The one or more processors 132 may generate one or more depth maps 401 based on the images 301, where the pixel values of the depth map 401 may be proportional to the distance between the cameras 110 and the attached objects 121 in the image.

The visual sonar system 100 may include one or more vehicle modules, which include one or more machine-learning algorithms, such as a depth algorithm. The depth algorithm may be an MDE algorithm. The visual sonar system 100 may generate, using the depth algorithm, depth maps 401 of interested objects in one or more images 301 captured by the cameras 110. In some embodiments, the depth algorithm may conduct a depth estimation using stereo vision techniques, which may rely on two or more cameras of the cameras 110 to calculate depth by triangulation. In some other embodiments, the depth algorithm may estimate depth using images taken by a single camera of the cameras 110, such as the MDE-based technologies.

In embodiments, the depth algorithm, such as the MDE algorithm, may use models to generate depth maps 401, including, without limitation, Convolutional Neural Networks (CNNs) to learn hierarchical features from images for spatial information estimation, Recurrent Convolutional Neural Networks (RNNs), such as Long Short-Term Memory (LSTM) networks, to capture temporal dependencies in sequential data, Encoder-Decoder Architectures, such as U-Net, to extract features from the images 301 to generate the corresponding depth maps 401, Residual Networks (ResNets), such as ResNet-50 and ResNet-101, to address the vanishing gradient problem for improved depth estimation performance, and Generative Adversarial Networks (GANs) to generate realistic depth maps by learning the distribution of depth information in training data and producing high-quality depth estimations for single images.

In some embodiments, one or more attached objects 121 may be attached to the vehicle 101. The objects may be, without limitation, a cargo, a trailer, a bicycle, a kayak, a canoe, a surfboard, a paddleboard, a toolbox, camping gears, a ladder, an emergency light, or any objects suitable to be attached to the vehicle. The vehicle 101 may include one or more attachment accessories 120, configured to moveably attach or mount the attached objects 121 to the vehicle 101. The attachment accessories 120 may include, without limitation, a stand, a rack, a cargo carrier, a roof rack, a bed extender, a tow hook, a tow strip, a hitch receiver, a suction cup, a magnetic mount, a customized welding or fabrication, or any combination thereof. While FIG. 1 depicts that the object 121 is attached to back of the vehicle 101, an object may be attached to the top of the vehicle 101, the front of the vehicle 101, or the side of the vehicle 101.

The attached objects 121 attached to the vehicle 101 and the attachment accessories 120 may be imaged by the one or more cameras 110 and included in the imaged environment 111 around the vehicle 101 in one or more images 301. The images 301 may be, without limitation, monocular images, RGB images, or RGB-D images. When the visual sonar system 100 generates a depth map 401 of the environment 111 based on an image 301 generated by the camera 110, the depth map 401 may include a boundary of the parking space 305 and a boundary of the vehicle 101. The boundary of the vehicle 101 may include the vehicle 101, the attached objects 121, and the attachment accessories 120.

Figure 2:
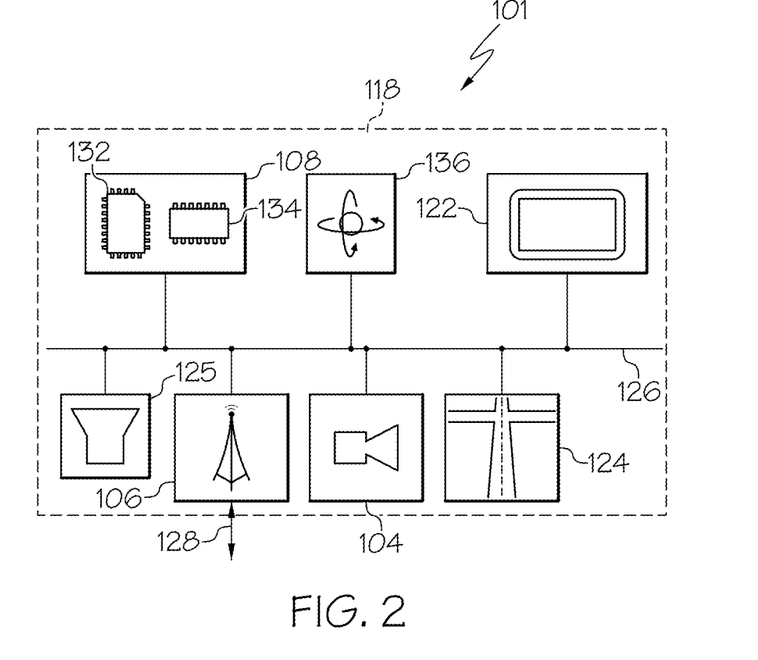
FIG. 2 is a schematic showing the various systems of the vehicle, according to one or more embodiments shown and described herein.

FIG. 2 is a schematic showing the various systems of the vehicle 101. It is to be understood that the vehicle 101 is not limited to the systems and features shown in FIG. 2 and that each may include additional features and systems. The vehicle 101 may be an automobile, a boat, a plane, or any other transportation equipment. The vehicle 101 may also or instead be a device that may be placed onboard an automobile, a boat, a plane, or any other transportation equipment. As shown, the vehicle 101 may include a data unit 118 for generating, processing, and transmitting data.

The data unit 118 includes an electronic control unit (ECU) 108, a network interface hardware 106, one or more imaging sensors 104, a screen 122, a navigation module 124, a speaker 125, and one or more motion sensors 136 that may be connected by a communication path 126. The network interface hardware 106 may connect the vehicle 101 to external systems via an external connection 128. For example, the network interface hardware 106 may connect the vehicle 101 to other vehicles directly (e.g., a direct connection to another vehicle proximate to the vehicle 101) or to an external network such as a cloud server.

Still referring to FIG. 2, the ECU 108 may be any device or combination of components including one or more processors 132 and one or more non-transitory processor-readable memory modules 134. The one or more processors 132 may be any device capable of executing a processor-readable instruction set stored in the one or more non-transitory processor-readable memory modules 134. Accordingly, the one or more processors 132 may be an electric controller, an integrated circuit, a microchip, a computer, or any other computing device. The one or more processors 132 is communicatively coupled to the other components of the data unit 118 by the communication path 126. Accordingly, the communication path 126 may communicatively couple any number of processors 132 with one another, and allow the components coupled to the communication path 126 to operate in a distributed computing environment. Specifically, each of the components may operate as a node that may send and/or receive data.

The one or more non-transitory processor-readable memory module 134 may be coupled to the communication path 126 and communicatively coupled to the one or more processors 132. The one or more non-transitory processor-readable memory modules 134 may include RAM, ROM, flash memories, hard drives, or any non-transitory memory device capable of storing machine-readable instructions such that the machine-readable instructions can be accessed and executed by the one or more processors 132. The machine-readable instruction set may include logic or algorithm(s) written in any programming language of any generation (e.g., 1GL, 2GL, 3GL, 4GL, or 5GL) such as, for example, machine language that may be directly executed by the one or more processors 132, or assembly language, object oriented programming (OOP), scripting languages, microcode, etc., that may be compiled or assembled into machine readable instructions and stored in the non-transitory processor-readable memory module 134. Alternatively, the machine-readable instruction set may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. In embodiments, the one or more non-transitory processor-readable memory modules 134 may store one or more vehicle modules, one or more machine-learning algorithms, and one or more depth algorithms.

In embodiments, the ECU 108 may conduct the MDE using the depth algorithms. The depth algorithms may be pre-trained using sample images and depth maps. The vehicle modules may be trained and provided with machine-learning capabilities via a neural network as described herein. By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (Sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one-to-one, one-to-many, many-to-one, and/or many-to-many (e.g., sequence-to-sequence) sequence modeling. The one or more ANN models may employ a combination of artificial intelligence techniques, such as, but not limited to, Deep Learning, Random Forest Classifiers, Feature extraction from audio, images, clustering algorithms, or combinations thereof. In some embodiments, a convolutional neural network (CNN) may be utilized. For example, a convolutional neural network (CNN) may be used as an ANN that, in the field of machine learning, for example, is a class of deep, feed-forward ANNs applied for audio analysis of the recordings. CNNs may be shift or space-invariant and utilize shared-weight architecture and translation. Further, each of the various modules may include a generative artificial intelligence algorithm. The generative artificial intelligence algorithm may include a general adversarial network (GAN) that has two networks, a generator model and a discriminator model. The generative artificial intelligence algorithm may also be based on variation autoencoder (VAE) or transformer-based models. For example, the depth algorithm may involve training convolutional neural networks (CNNs) on large datasets containing pairs of example images and their corresponding depth maps. The depth maps provide ground truth depth information for each pixel in the example images. The CNN may learn to map input example images to corresponding depth maps by capturing the spatial relationships between objects and their depths in the example images.

Still referring to FIG. 2, one or more imaging sensors 104 are coupled to the communication path 126 and communicatively coupled to the one or more processors 132. While the particular embodiment depicted in FIG. 2 shows an icon with one imaging sensor and reference is made herein to "imaging sensor" in the singular with respect to the data unit 118, it is to be understood that this is merely a representation and embodiments of the system may include one or more imaging sensors having one or more of the specific characteristics described herein.

The one or more imaging sensors 104 may include one or more cameras 110, such as the front camera 110a, the side cameras 110b, and the rear camera 110c. The cameras 110 may be, without limitation, one or more of monocular cameras, RGB cameras, or RGB-D cameras. The cameras 110 may be, without limitation, one or more of rearview cameras, side-view cameras, front-view cameras, or top-mounted cameras. In some embodiments, the one or more imaging sensors 104 may be any device having an array of sensing devices capable of detecting radiation in an ultraviolet wavelength band, a visible light wavelength band, or an infrared wavelength band. The one or more imaging sensors 104 may have any resolution. In some embodiments, one or more optical components, such as a mirror, fish-eye lens, or any other type of lens may be optically coupled to the one or more imaging sensors 104. In embodiments described herein, the one or more imaging sensors 104 may provide image data to the ECU 108 or another component communicatively coupled to the communication path 126. The image data may include image data of the environment 111 around the first vehicle 101. In some embodiments, for example, in embodiments in which the vehicle 101 is an autonomous or semi-autonomous vehicle, the one or more imaging sensors 104 may also provide navigation support. That is, data captured by the one or more imaging sensors 104 may be used by the navigation module 124 to autonomously or semi-autonomously navigate the vehicle 101.

The one or more imaging sensors 104 may operate in the visual and/or infrared spectrum to sense visual and/or infrared light. Additionally, while the particular embodiments described herein are described with respect hardware for sensing light in the visual and/or infrared spectrum, it is to be understood that other types of sensors are contemplated. For example, the systems described herein could include one or more LIDAR sensors, radar sensors, sonar sensors, or other types of sensors and such data could be integrated into or supplement the data collection described herein to develop a fuller real-time traffic image.

In operation, the one or more imaging sensors 104 capture image data and communicate the image data to the ECU 108 and/or to other systems communicatively coupled to the communication path 126. The image data may be received by the processor 132, which may process the image data using one or more image processing algorithms. The imaging processing algorithms may include, without limitation, an object recognition algorithm, such as a real-time object detection models, and a depth algorithm, such as the MDE depth algorithm. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movements from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded-up robust features ("SURF"), and edge-detection algorithms. The image processing algorithms may include machine learning functions and be trained with sample images including ground truth objects and depth information.

The network interface hardware 106 may be coupled to the communication path 126 and communicatively coupled to the ECU 108. The network interface hardware 106 may be any device capable of transmitting and/or receiving data with external vehicles or servers directly or via a network. Accordingly, network interface hardware 106 can include a communication transceiver for sending and/or receiving any wired or wireless communication. For example, the network interface hardware 106 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 106 may include hardware configured to operate in accordance with the Bluetooth wireless communication protocol and may include a Bluetooth send/receive module for sending and receiving Bluetooth communications.

In embodiments, the data unit 118 may include one or more motion sensors 136 for detecting and measuring motion and changes in motion of the vehicle 101. Each of the one or more motion sensors 136 is coupled to the communication path 126 and communicatively coupled to the one or more processors 132. The motion sensors 136 may include inertial measurement units. Each of the one or more motion sensors 136 may include one or more accelerometers and one or more gyroscopes. Each of the one or more motion sensors 136 transforms the sensed physical movement of the vehicle 101 into a signal indicative of an orientation, a rotation, a velocity, or an acceleration of the vehicle 101. In some embodiments, the motions sensors 136 may include one or more steering sensors. The one or more steering sensors may include, without limitation, one or more of steering angle sensors, vehicle speed sensors, gyroscopes, inertial measurement units, or any other steering sensors operable to collect data on vehicle trajectory. For example, the steering angle sensor may measure the rotation of the steering wheels of the vehicle 101 and provide data on the angle at which the steering wheel is turned, indicating the intended direction of the vehicle. The vehicle speed sensors may monitor the speed of the vehicle wheels to provide real-time data on the vehicle's speed. The gyroscopes may detect the changes in orientation and angular velocity of the vehicle 101 by measuring the rate of rotation around different axes.

In embodiments, the data unit 118 includes a screen 122 for providing visual output such as, for example, maps, navigation, entertainment, seat arrangements, real-time images/videos of surroundings, or a combination thereof. The screen 122 may be located on the head unit of the vehicle 101 such that a driver of the vehicle 101 may see the screen 122 while seated in the driver's seat. The screen 122 is coupled to the communication path 126. Accordingly, the communication path 126 communicatively couples the screen 122 to other modules of the data unit 118. The screen 122 may include any medium capable of transmitting an optical output such as, for example, a cathode ray tube, a light emitting diode (LED) display, an organic light emitting diode (OLED) display, a liquid crystal display, a plasma display, or the like. In embodiments, the screen 122 may be a touchscreen that, in addition to visually displaying information, detects the presence and location of a tactile input upon a surface of or adjacent to the screen 122. The screen may display images captured by the one or more imaging sensors 104. In some embodiments, the screen may display a depth map that is generated based on the image captured by the one or more imaging sensors 104.

In embodiments, the data unit 118 may include the navigation module 124. The navigation module 124 may be configured to obtain and update positional information of the first vehicle 101 and to display such information to one or more users of the first vehicle 101. The navigation module 124 may be able to obtain and update positional information based on geographical coordinates (e.g., latitudes and longitudes), or via electronic navigation where the navigation module 124 electronically receives positional information through satellites. In certain embodiments, the navigation module 124 may include a GPS system.

In embodiments, the data unit 118 includes the speaker 125 for transforming data signals into mechanical vibrations, such as in order to output audible prompts or audible information to a driver of the vehicle. The speaker 125 is coupled to the communication path 126 and communicatively coupled to the one or more processors 132. The speaker 125 may output a warning sound based on distances between the vehicle 101 and external objects measured by the visual sonar system 100.

In embodiments, the one or more processors 132 may operably control the steering and break of the vehicle 101 to enable the vehicle 101 to perform various maneuvers, such as, without limitation, accelerating or decelerating to reach a desirable velocity, stopping at desirable position, and turning at desirable angle.

Figure 3A:
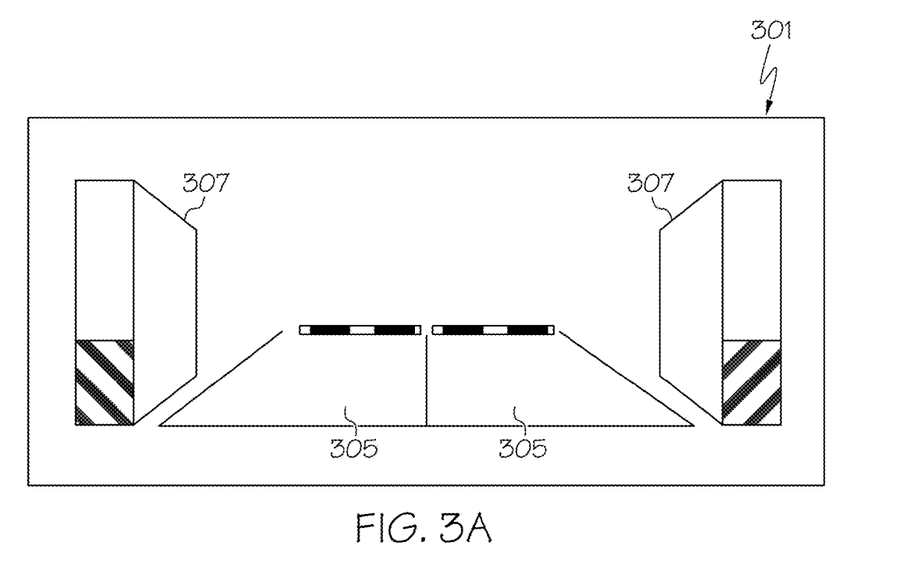
FIG. 3A schematically depicts an example image of the rearview of the environment, according to one or more embodiments shown and described herein.
Figure 3B:
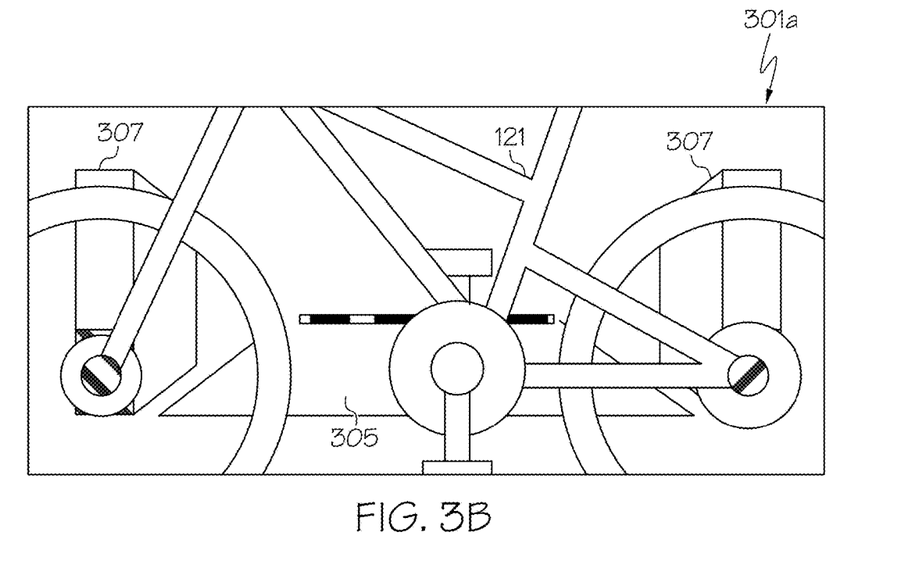
FIG. 3B schematically depicts an example image of the rearview of the environment and an attached object to the vehicle, according to one or more embodiments shown and described herein.
Figure 3C:
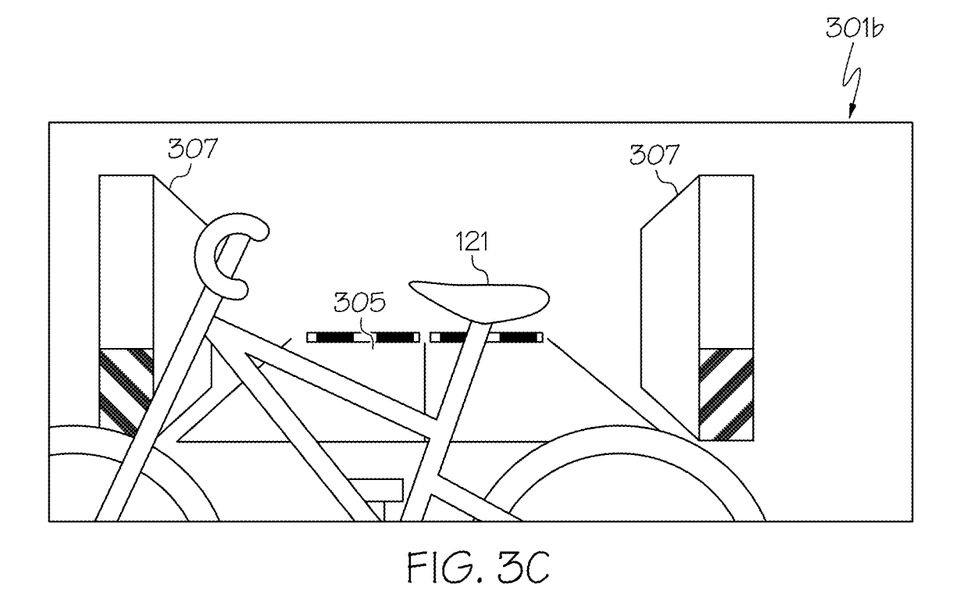
FIG. 3C schematically depicts an example image of the rearview of the environment and an attached object to the vehicle captured by a second camera, according to one or more embodiments shown and described herein.
Figure 3D:
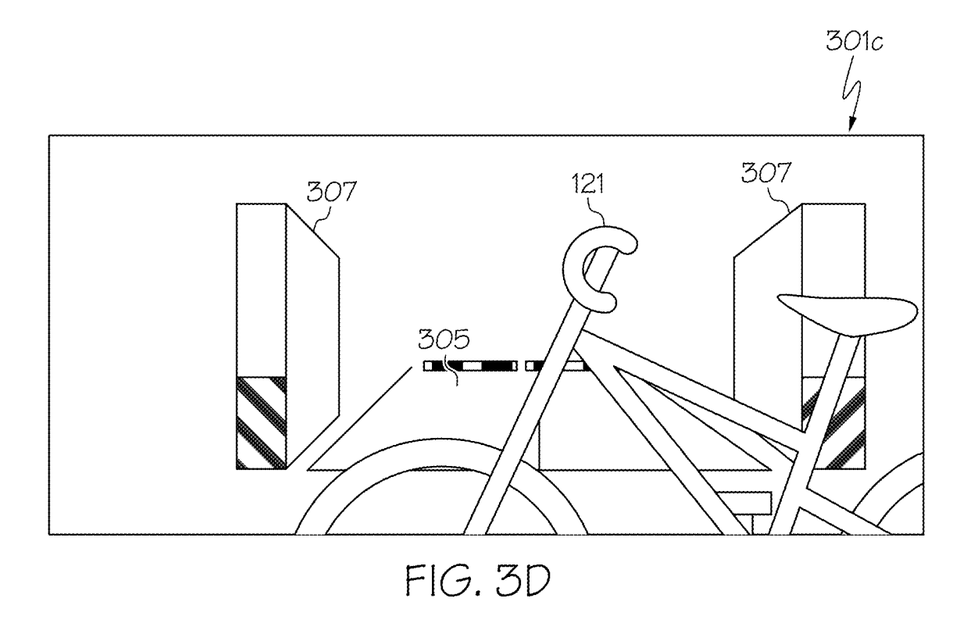
FIG. 3D schematically depicts an example image of the rearview of the environment and an attached object to the vehicle captured by a third camera, according to one or more embodiments shown and described herein.
Figure 4A:
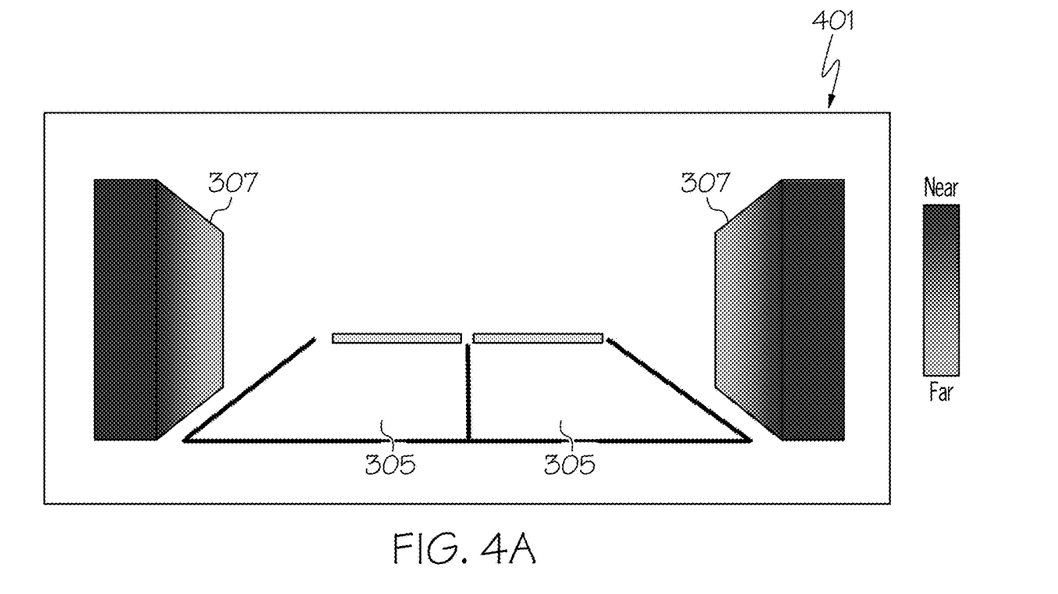
FIG. 4A schematically depicts an example depth map of the rearview of the environment including depth information, according to one or more embodiments shown and described herein.
Figure 4B:
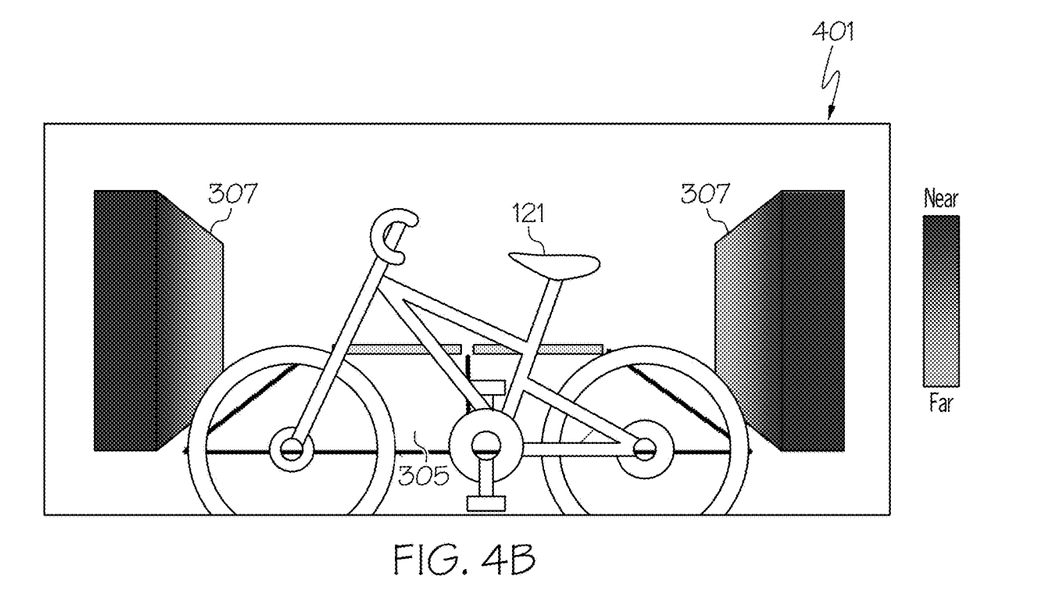
FIG. 4B schematically depicts an example depth map of the rearview of the environment and an attachment to the vehicle including depth information, according to one or more embodiments shown and described herein.

Referring now to FIGS. 3A-4B, example images 301 captured by cameras 110 and example depth maps 401 generated by the visual sonar system 100 are depicted. In embodiments, the one or more cameras 110 of the vehicle 101 may image the environment 111 surrounding the vehicle 101 to generate one or more images 301. As illustrated in FIGS. 3A-3D, in some embodiment, the images 301 may include one or more parking space 305 and one or more obstacles 307. Each parking space 305 may include, without limitation, a parking stall, markings, symbols (e.g., no parking zones, accessible parking designations, loading/unloading areas), wheel stops, signage (e.g., parking regulations, time limits, permit requirements, restrictions, safety warnings), or other structure and elements associated with the parking space 305. One or more objects and obstacles 307 may be present near or around the parking spaces 305, such as the wheel stop, and physical structures such as walls or barriers as part of the parking building. The obstacles 307 may be positioned close to parking spaces in a way that drivers need to be mindful of their proximity to the obstacles 307 when maneuvering into or out of parking spaces. The obstacles 307 may be marked with caution stripes or hazard stripes. In some embodiments, as illustrated in FIG. 3A, the image 301 may not include any attached object 121 or attachment accessory 120. In these embodiments, the visual sonar system 100 may not use the images 301 to identify any attached objects 121 and to generate a boundary of the vehicle 101 combined with the attached object 121. The visual sonar system 100 may generate an updated vehicle boundary of the vehicle 101 based on a change of dimension of the vehicle 101, for example, due to attachment and/or removal of one or more of the attached objects 121. For example, as illustrated in FIG. 1, the visual sonar system 100 may generate an updated vehicle boundary of the vehicle 101 after the attachment of the bike to include both original vehicle boundary 115 and the attachment boundary 116 and further to have the vehicle 101 operated based on the updated vehicle boundary.

As illustrated in FIG. 3B, in some embodiments, the image 301*a* taken by the cameras 110, such as the rear camera 110*c*, may include, the obstacles 307, the parking space 305, the wheel stop, one or more attached objects 121, and attachment accessories 120, such as a bike attached to a rack attached to the vehicle 101.

In some embodiments, the image 301*a* taken by one of the cameras 110, such as the rear camera 110*c*, may not include at least one edge or corner of the attached object. For example, as illustrated in FIG. 3B, some parts of the bike as the attached object 121 are not displayed in the image 301*a*. The visual sonar system 100 may use one or more other cameras, such as side cameras 110*b*, to image the attached objects to generate additional images 301*b* and 301*c*, as illustrated in FIGS. 3C and 3D. The visual sonar system 100 may determine that the additional images 301*b* and 301*c* may include the edges and/or corners missing in the image 301*a* and further use the additional images 301*b* and 301*c* to combine with the image 301*a* to generate a full view of the attached object 121 for dimensional estimation and vehicle boundary updating.

As illustrated in FIGS. 4A and 4B, the visual sonar system 100 may generate the depth map 401 based on the images 301. For example, the system may use one or more of the depth algorithms, such as the MDE algorithms, to generate depth maps 401 from the input images 301. The visual sonar system 100 may extract relevant features in the images 301 using machine-learning functions, such as CNNs to capture desired visual cues. The visual sonar system 100 may then process these features using a depth prediction network that learns to map the features to depth values. The visual sonar system 100 may estimate the distances of objects, such as the parking spaces 305, the obstacles 307, and the attached objects 121, in the environment 111 surrounding the vehicle 101 from the viewpoint of the camera 110 (e.g., the rear camera 110*c*) capturing the image 301. For example, as illustrated in FIG. 4A, the depth map 401 is generated based on the image 301 in FIG. 3A, where no attached object 121 is captured within the image 301. The shapes, locations, and depth information of the objects, such as the obstacles 307 and the wheel stops, are represented in the depth map 401, with the dark monochromatic color representing near and light monochromatic color representing far to the rear camera 110c. Similarly, as illustrated in FIG. 4B, the depth map 401 is generated based on the image 301a captured with the rear camera 110c in FIG. 3B in further combination with the additional images 301b and 301c captured by the side cameras 110b, which includes the bike as the attached object 121 is attached to the rear of the vehicle 101. The attached object 121 in the depth map 401 has the darkest color suggesting the attached object 121 is the closest object to the rear camera 110c. In some embodiments, the visual sonar system 100 may generate depth maps 401 for each images captured by different cameras 110, such as the image 301a, 301b, and 301c, and then use the depth maps 401 to generate the boundary of the vehicle 101 combined with the attached object 121 based on all the depth maps 401 generated by different cameras 110. For example, the boundary of the vehicle 101 combined with the attached object 121 may be generated by aggregating the depth map 401 based on the image 301a and the depth map 401 based on the additional images 301b and 301c.

The visual sonar system 100 may recognize the attached object 121 based on the image 301a of FIG. 3B. In some embodiment, the visual sonar system 100 may recognize the attached object 121 using the one or more pre-trained real-time object detection models, as discussed further above. In some embodiments, the visual sonar system 100 may recognize the attached object 121 based on the depth map 401. For example, in some embodiments, the visual sonar system 100 may identify the attached object 121 from the image 301a based on a comparison of depths in the depth map 401 and an attachment depth threshold. For example, the attachment depth threshold may represent a maximum allowable distance between the vehicle 101 and the attached object 121 in the depth map 401. The visual sonar system 100 may determine that objects within the attachment depth threshold are part of the vehicle 101 and are not treated as obstacles 307 during maneuvers, such as moving backward. The attachment depth threshold may be set based on the physical dimensions of the vehicle 101, the precision of depth sensing technology of the vehicle 101, and the expected range of distances between the vehicle 101 and any attached components. The attachment depth threshold may be manually changed by the user.

In some embodiments, the cameras 110 may continuously generate the images 301 in a sequence of time frames. The visual sonar system 100 may generate corresponding depth maps 401 from the images 301 in the sequence of time frames. The visual sonar system 100 may identify the attached object 121 from the corresponding depth maps 401 representing a substantially constant depth and a substantially constant coordinate in the corresponding depth maps 401. In some embodiments, when the cameras 110 continuously generates images 301 in the sequence of time frames, the vehicle 101 may further using the one or more steering sensors to generate a real-time trajectory of the vehicle 101. The trajectory may represent the path or movement of the vehicle 101 over time, such as trajectory information of the vehicle's position, orientation, velocity, and acceleration. The visual sonar system 100 may identify the attached object 121 based on the relative motion of the attached object 121 against the vehicle 101 and the real-time trajectory of the vehicle 101. By comparing the relative motion of the attached object 121 in the images 301 and/or the depth maps 401 against the vehicle trajectory, the visual sonar system 100 may identify the attached object 121 that exhibits motion patterns consistent with being attached to the vehicle 101.

In embodiments, the depth algorithms, such as the MDE algorithms, may be pre-trained. The visual sonar system 100 may train the depth algorithms on datasets with ground truth images and corresponding depth maps. The visual sonar system 100 may optimize the models in the depth algorithms for depth map predictions through validation processes, such as backpropagation. The visual sonar system 100 may further apply post-processing to refine the depth map to output the depth map as a grayscale image representing estimated object distances to the cameras taking the image. For example, the pre-training may include labeling the example images and desirable depth information in the images and using one or more neural networks to learn to predict the desirable and undesirable depth information from the input images based on the training data. The pre-training may further include fine-tuning, evaluation, and testing steps. The vehicle modules of the depth algorithms may be continuously trained using the real-world collected data to adapt to changing conditions and factors and improve the performance over time. The neural network may be trained based on the backpropagation using activation functions. For example, the encoder may generate encoded input data h=(Wx+b) that is transformed from the input data of one or more input channels. The encoded input data of one of the input channels may be represented as $h_{ij}=g\ (Wx_{ij}+b)$ from the raw input data $x_{ij}$, which is then used to reconstruct the output $\tilde{x}_{ij}=f(W^T h_{ij}+b')$. The neural networks may reconstruct outputs, such as the depth information in the depth map, into x'=(W$^T$h+b'), where W is weight, b is bias, W$^T$, and b' are transverse values of W and b and are learned through backpropagation. In this operation, the neural networks may calculate, for each input data, the distance between an input data x and a reconstructed input data x', to yield a distance vector |x−x'|. The neural networks may minimize the loss function which is a utility function as the sum of all distance vectors. The accuracy of the predicted output may be evaluated by satisfying a preset value, such as a preset accuracy and area under the curve (AUC) value computed using an output score from the activation function (e.g. the Softmax function or the Sigmoid function). For example, the visual sonar system 100 may assign the preset value of the AUC with a value of 0.7 to 0.8 as an acceptable simulation, 0.8 to 0.9 as an excellent simulation, or more than 0.9 as an outstanding simulation. After the training satisfies the preset value, the pre-trained or updated depth algorithm may be stored in the ECU 108. In embodiments, the visual sonar system 100 may conduct a similar pre-training process to the real-time object detection models with ground truth input images and corresponding identified objects, particularly with the ground truth input images captured by vehicle onboard cameras and the corresponding identified objects being attached to the sample vehicles.

The visual sonar system 100 may generate a boundary of the parking spaces 305 based on the depth map 401 and generate the boundary of the vehicle 101 combined with the attached object 121 based on the depth map 401. In embodiments, the visual sonar system 100 may generate the updated vehicle boundary based on the depth map 401 after recognizing the attached object 121. Based on the continuously captured images 301, the visual sonar system 100 may further generate an extended boundary of the parking space 305 by aggregating space and time information in the corresponding depth maps 401 generated from the continuously captured images 301. The boundary and the extended boundary of the parking space 305, the original vehicle boundary 115, the attachment boundary 116, and the updated vehicle boundary may be two-dimensional or three-dimensional. The visual sonar system 100 may continuously determine whether the distance between the boundary of the parking spaces 305 and the updated boundary of the vehicle 101, which includes both the original vehicle boundary 115 and the attachment boundary 116, is less than a threshold value, and output an alert in response to determining that the distance is less than the threshold value. The threshold value may be predetermined based on, without limitation, the dimensional of the vehicle 101, the updated boundary of the vehicle 101, the reaction time of a user, and/or the velocity of the vehicle 101. In some embodiments, the visual sonar system 100 may operate the vehicle 101 to avoid a collision between the vehicle 101 and the parking space 305 or the obstacles 307 in response to determining that the distance is less than the threshold value.

Figure 5:
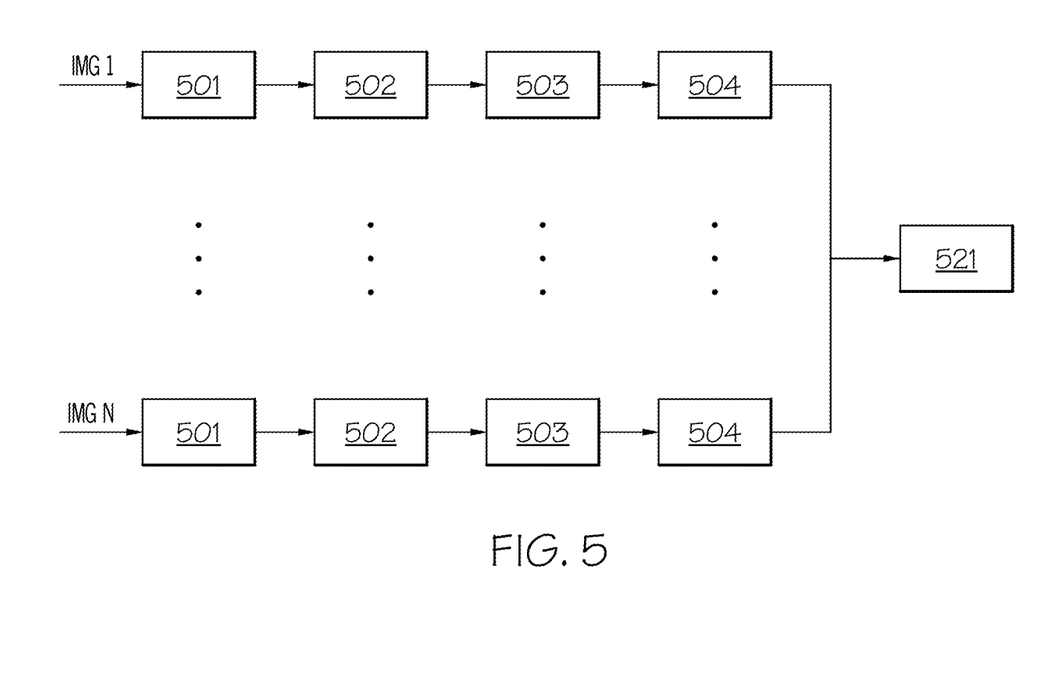
FIG. 5 depicts graphs illustrating the operations of the system, according to one or more embodiments shown and described herein.

Referring to FIG. 5, the operations of the visual sonar system 100 described herein are depicted. The process of the operation may be divided into two parts. In the first part, the images 301 generated by the cameras 110 (such as the front camera 110a, the side cameras 110b, and the rear camera 110c) are processed separately. Note that the images being processed as illustrated in FIG. 5 may be generated by a single camera 110 but at different time stamps. In some embodiments, the images may be generated by different cameras, such as the cameras 110a, 110b, 110c at the same time stamp or at different time stamps. For each image such as IMG 1 and IMG N in FIG. 5, the image may be processed into an MDE image in step 501. In step 502, the visual sonar system 100 may calculate the three-dimensional (3D) input of the image. In step 503, the visual sonar system 100 may conduct a ground removal of the image. In step 504, the system may conduct a scale estimate of the image. In the second part, the processed images may be aggregated in step 521 using point aggregation technology such that the generated aggregated images include both time and space information of the environment 111.

Figure 6:
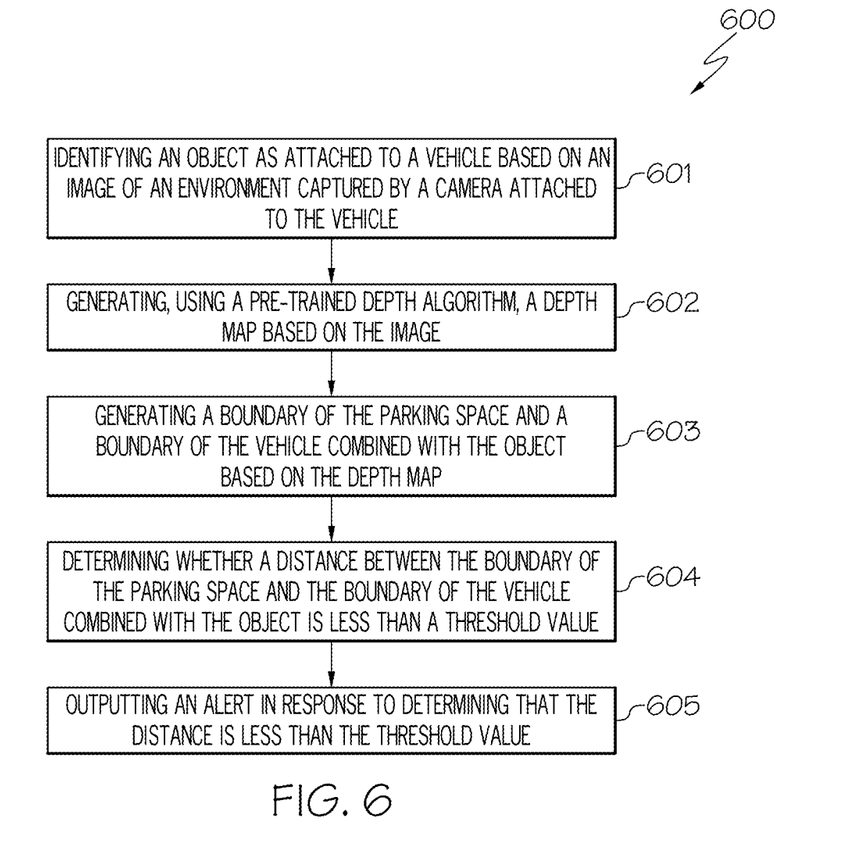
FIG. 6 depicts a flowchart of illustrative steps for vehicle environment detection based on adapted vehicle geometry of the present disclosure, according to one or more embodiments shown and described herein.

Referring to FIG. 6, a flowchart of illustrative steps for vehicle environment detection based on the blocked view of the present disclosure is depicted. At block 601, the method 600 for adapted vehicle geometry includes identifying the attached object 121 as attached to the vehicle 101 based on the image 301 of the environment 111 captured by the one or more cameras 110 attached to the vehicle 101. The environment 111 includes one or more parking spaces 305 and the attached object 121. At block 602, the method 600 includes generating, using a pre-trained depth algorithm, the depth map 401 based on the image 301. At block 603, the method 600 includes generating a boundary of the parking spaces 305 and a boundary of the vehicle 101 combined with the attached object 121 based on the depth map 401. At block 604, the method 600 includes determining whether a distance between the boundary of the parking spaces 305 and the boundary of the vehicle 101 combined with the attached object 121 is less than a threshold value. At block 605, the method 600 includes outputting an alert in response to determining that the distance is less than the threshold value.

In some embodiments, the attached object 121 may be identified from the image 301 or the depth map 401. In some embodiments, the method 600 may further include identifying the attached object 121 based on a comparison of depths in the depth map and an attachment depth threshold. In some embodiments, the method 600 may further include continuously generating the images 301 captured in a sequence of time frames, generating corresponding depth maps 401 in the sequence of time frames, identifying the attached object from the corresponding depth maps 401 representing a substantially constant depth and a substantially constant coordinate in the corresponding depth maps.

In some embodiments, the method 600 may further include determining whether at least one edge or corner of the attached object 121 is absent in the image, in response to determining that the at least one edge or corner of the attached object 121 is absent in the image, capturing, using a second camera 110 attached to a different part of the vehicle 101 than the camera 110, a second image 301 including the attached object 121, and generating a second depth map 401 based on the second image 301, and generating the boundary of the vehicle 101 combined with the attached object 121 by aggregating the depth map 401 and the second depth map 401.

In some embodiments, the method 600 may further include continuously generating images 301 captured in a sequence of time frames, generating corresponding depth maps 401 in the sequence of time frames, and generating an extended boundary of the parking spaces 305 by aggregating space and time information in the corresponding depth maps 401.

In some embodiments, the method 600 may further include generating a real-time trajectory of the vehicle 101 using one or more steering sensors of the vehicle 101, continuously generating images 301 captured in a sequence of time frames, and identifying the attached object 121 based on a relative motion of the attached object 121 against the vehicle 101 and the real-time trajectory of the vehicle 101. The one or more steering sensors may include, without limitation, a steering angle sensor, a vehicle speed sensor, a gyroscope, or a combination thereof.

In some embodiments, the method 600 may further include operating the vehicle 101 to avoid a collision between the vehicle 101 and the parking spaces 305 or the obstacle 307 in response to determining that the distance is less than the threshold value. The parking spaces 305 may include, without limitation, a parking stall, markings, wheel stops, or a combination thereof.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

It should also be understood that, unless clearly indicated to the contrary, in any methods claimed herein that include more than one step or act, the order of the steps or acts of the method is not necessarily limited to the order in which the steps or acts of the method are recited.

It is to be understood that the embodiments are not limited in their application to the details of construction and the arrangement of components set forth in the description or illustrated in the drawings. The invention is capable of some embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

What is claimed is:

1. A system comprising:
a vehicle comprising a camera operable to generate an image of an environment surrounding the vehicle, the environment comprising a parking space and an object removably attached to the vehicle;
one or more processors operable to:
identify the object as attached to the vehicle based on a comparison of depths in the depth map and an attachment depth threshold;
generate, using a pre-trained depth algorithm, a depth map based on the image;
generate a boundary of the parking space and a boundary of the vehicle combined with the object based on the depth map;
determine whether a distance between the boundary of the parking space and the boundary of the vehicle combined with the object is less than a threshold value; and
output an alert in response to determining that the distance is less than the threshold value.

2. The system of claim 1, wherein the camera continuously generates images in a sequence of time frames, and the one or more processors are further operable to:
generate corresponding depth maps in the sequence of time frames; and
identify the object as attached to the vehicle based on a substantially constant depth and a substantially constant coordinate in the corresponding depth maps.

3. The system of claim 1, wherein the camera is a rearview camera, a side-view camera, a front-view camera, or a top-mounted camera.

4. The system of claim 1, wherein the system further comprises a second camera attached to a different part of the vehicle than the camera, the one or more processors are further operable to:
determine whether at least one edge or corner of the object is absent in the image,
in response to determining that the at least one edge or corner of the object is absent in the image, capture, using the second camera, a second image comprising the object, and generate a second depth map based on the second image; and
generate the boundary of the vehicle combined with the object based on the depth map and the second depth map.

5. The system of claim 4, wherein the boundary of the vehicle combined with the object is generated by aggregating the depth map and the second depth map.

6. The system of claim 4, wherein the camera is a rearview camera and the second camera is a side-view camera, or vice versa.

7. The system of claim 1, wherein the vehicle comprises one or more steering sensors configured to generate a real-time trajectory of the vehicle, the camera continuously generates images in a sequence of time frames to determine a relative motion between the object and the vehicle, and the one or more processors are further operable to identify the object as attached to the vehicle based on the relative motion of the object against the vehicle and the real-time trajectory of the vehicle.

8. The system of claim 1, wherein the one or more processors are further operable to operate the vehicle to avoid a collision of the vehicle or the object with the parking space in response to determining that the distance is less than the threshold value.

9. The system of claim 1, wherein the boundary of the parking space is two-dimensional or three-dimensional.

10. The system of claim 1, wherein the camera is a monocular camera, a red-green-blue (RGB) camera, or a red-green-blue-depth (RGB-D) camera.

11. The system of claim 1, wherein the parking space comprises a parking stall, markings, wheel stops, or a combination thereof.

12. A method comprising:
identifying an object as attached to a vehicle based on;
an image of an environment captured by a camera attached to the vehicle, the environment comprising a parking space and the object, and
a comparison of depths in the depth map and an attachment depth threshold;
generating, using a pre-trained depth algorithm, a depth map based on the image;
generating a boundary of the parking space and a boundary of the vehicle combined with the object based on the depth map;
determining whether a distance between the boundary of the parking space and the boundary of the vehicle combined with the object is less than a threshold value; and
outputting an alert in response to determining that the distance is less than the threshold value.

13. The method of claim 12, wherein the camera continuously generates images in a sequence of time frames, and the method further comprises:
generating corresponding depth maps in the sequence of time frames; and
identifying the object as attached to the vehicle based on a substantially constant depth and a substantially constant coordinate in the corresponding depth maps.

14. The method of claim 12, wherein the camera is a rearview camera, a side-view camera, a front-view camera, a top-mounted camera, a monocular camera, a red-green-blue (RGB) camera, or a red-green-blue-depth (RGB-D) camera.

15. The method of claim 12, wherein the method further comprises:
determining whether at least one edge or corner of the object is absent in the image,
in response to determining that the at least one edge or corner of the object is absent in the image, capturing, using a second camera attached to a different part of the vehicle than the camera, a second image comprising the object, and generating a second depth map based on the second image; and
generating the boundary of the vehicle combined with the object by aggregating the depth map and the second depth map.

16. The method of claim 12, wherein:
the camera continuously generates images in a sequence of time frames to determine a relative motion between the object and the vehicle; and
the method further comprises identifying the object as attached to the vehicle based on the relative motion of the object against the vehicle and a real-time trajectory of the vehicle generated by one or more steering sensors of the vehicle.

17. The method of claim 12, wherein the method further comprises operating the vehicle to avoid a collision of the vehicle or the object with the parking space in response to determining that the distance is less than the threshold value.

18. The method of claim 12, wherein:
the boundary of the parking space is two-dimensional or three-dimensional; and
the parking space comprises a parking stall, markings, wheel stops, or a combination thereof.

* * * * *